Patented June 12, 1923.

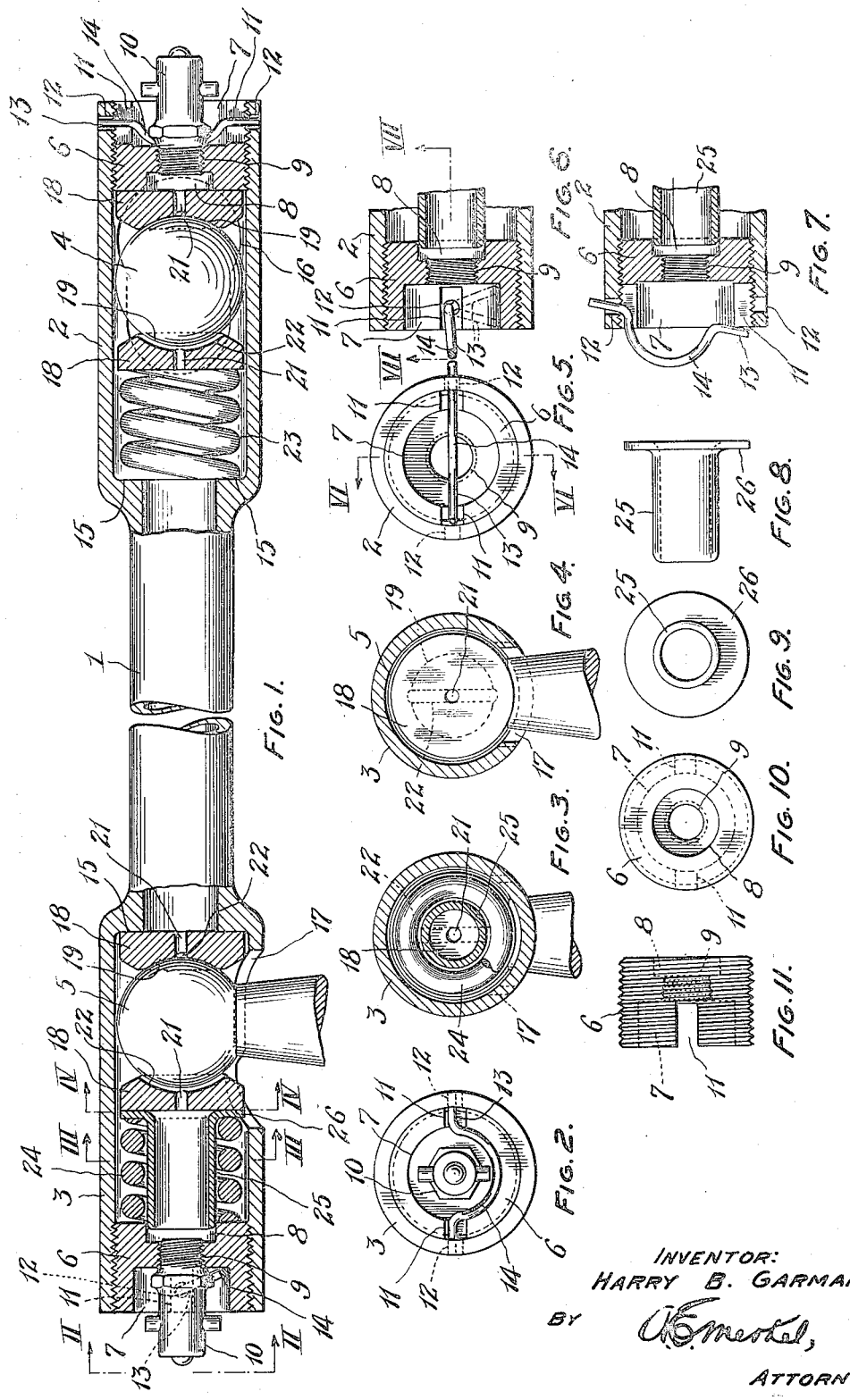

1,458,332

UNITED STATES PATENT OFFICE.

HARRY B. GARMAN, OF DETROIT, MICHIGAN, ASSIGNOR TO STEEL PRODUCTS COMPANY, OF CLEVELAND, OHIO, A CORPORATION OF OHIO.

DRAG LINK.

Application filed December 14, 1921. Serial No. 522,375.

*To all whom it may concern:*

Be it known that I, HARRY B. GARMAN, a citizen of the United States, resident of Detroit, county of Wayne, and State of Michigan, have invented new and useful Improvements in Drag Links, of which the following is a specification, the principle of the invention being herein explained and the best mode in which I have contemplated applying that principle, so as to distinguish it from other inventions.

My invention relates to drag links for use as a part of the steering mechanism of automobiles, and particularly to the floating type of drag link, i. e., in which the bearings are free to float inside the tube and thus conform to any irregularities in the steering arm and axle arm ball. It is the object of this invention to provide, in a ball joint of the type having a yieldable bearing member, efficient means for supplying lubricant directly to the bearing surfaces.

The annexed drawings and following description set forth in detail certain means embodying my invention, the disclosed means, however, constituting but one of the various mechanical forms in which the principle of the invention may be employed.

In said annexed drawings:

Fig. 1 represents a broken partial side elevation showing the joints at the ends of the link in vertical section.

Fig. 2 is an end elevation viewed as indicated by the line II—II in Fig. 1.

Fig. 3 is a section on line III—III of Fig. 1.

Fig. 4 is a section on line IV—IV of Fig. 1.

Fig. 5 is an end view showing the locking pin in released position.

Fig. 6 is a section on line VI—VI of Fig. 5.

Fig. 7 is a section on line VII—VII of Fig. 6.

Figs. 8 and 9 are side and end elevations, respectively, of the grease conduit.

Figs. 10 and 11 are end and side elevations respectively of the end plug.

Referring to the annexed drawings, the drag link 1 is constructed of a section of tubing having enlarged ends 2 and 3 forming sockets for the ball ends 4 and 5 of the steering arm and knuckle arm, respectively. The outer ends of the sockets 2 and 3 are closed by threaded plugs 6 screwed into the threaded ends thereof. The plugs 6 at the opposite ends of the link are identical in construction. The plug 6 has a counterbore 7 extending into the outer face thereof, a counterbore 8 extending into the inner face and a smaller axial bore 9 extending from the bottom of the counterbore 7 to the counterbore 8. The bore 9 is tapped to receive the threaded nipple of a grease cup 10. For locking the plug 6 in place the cylindrical wall formed by the counterbore 7 is slotted at diametrically opposite points 11 from the outer edge thereof to the bottom of the counterbore, the socket members 2 and 3 have diametrically disposed holes 12 adjacent the ends of the tube and a spring pin 13 having the central portion 14 thereof arched to fit within the counterbore 7 outside the grease cup is adapted to be sprung into place with its ends passing through the slots 11 and holes 12 and its arched portion lying against the bottom of the counterbore 7. The holes 12 are so positioned that when the plug is in place the holes 12 are substantially midway between the top and bottom of the counterbore 7. The spring pins 13 are so formed that the central portion 14 thereof bears with spring pressure against the wall of the counterbore so that when the portion 14 is forced into the bottom of the counterbore 7, as indicated in dotted lines in Fig. 6, the pin 13 is locked against accidental displacement. When the grease cup 10 is in place the locking pin 13 cannot be rotated to bring the arched portion 14 in line with the slots 11 and it is therefore impossible for the locking pin to become disengaged.

In assembling the end connections, the plug 6 is screwed into place, the pin 13 inserted and the grease cup 10 is then screwed into the plug. In taking apart, the grease cup is first removed, the spring pin 13 pried out and the plug 6 unscrewed.

Each of the sockets 2 and 3 is provided with a square shoulder 15 at the inner end thereof and with keyhole slots 16 and 17 adapted to permit the entry of the balls 4 and 5 respectively. The balls 4 and 5 are held in place between bearing blocks 18 which are of a diameter to fit within the tubular sockets 2 and 3. The blocks 18 each have a concave face 19 adapted to fit the balls 4 and 5, a grease duct 21 centrally therethrough to admit grease to the surface of the balls and a groove 22 across the concave face 19 thereof to distribute the grease over the surface of the ball.

In the socket 2 the outer bearing block 18 is seated against the inner face of the plug 6 and the inner bearing block is pressed against the ball 4 by a compression coil spring 23 seated upon the inner shoulder 15 and bearing against the rear face of the inner block 18. In this socket the grease passes from the grease cup 10 into the counterbore 8, which is closed by the block 18, and through the duct 21 to the ball 4.

In the socket 3 the inner bearing block 18 is seated upon the shoulder 15 at the inner end of the socket and the outer bearing block 18 is pressed against the opposite side of the ball 5 by a compression coil spring 24 between the plug 6 and the block. For conducting the grease to the ball 5 from the grease cup 10, I have provided at this end a conduit 25 the outer end of which fits in the counterbore 8 in the inner face of the plug 6 and the inner end of which has an outturned flange 26 adapted to lie flatly against the outer face of the outer bearing block 18. The spring 24 is seated at its inner end upon the flange 26 so that the conduit 25 moves with the bearing block, the outer end thereof being movable in the counterbore 8. Grease passes from the grease cup 10 through the conduit 25 and duct 21 through the block into contact with the ball 5. The lubricating oil is thus protected from dust and dirt entering the slots 16 or 17 and is carried directly to the bearing surfaces of the balls.

What I claim is:

1. The combination with a drag link having a tubular ball receiving socket in the end thereof; of an actuating arm having a ball end seated in said socket; a plug adapted to close the outer end of said socket; a grease cup carried by said plug; a bearing block fitting in said socket and engageable with the side of the ball toward the end of the socket, said bearing block having a grease duct therethrough; a coil spring interposed between said plug and bearing block; and a grease conduit extending from said grease cup to said bearing block.

2. The combination with a drag link having a tubular ball receiving socket in the end thereof; of an actuating arm having a ball end seated in said socket; a plug adapted to close the outer end of said socket, said plug having an axial bore tapped to receive the nipple of a grease cup and an enlarged central counterbore on the inner face thereof; a bearing block engageable with the ball on the side toward the plug; a grease conduit comprising a tubular member adapted to fit within said counterbore at its outer end and having an outturned flange at its inner end adapted to fit against the face of said bearing block; and a coil spring interposed between said plug and the flange of said conduit.

Signed by me this 9th day of November, 1921.

HARRY B. GARMAN.